United States Patent
Yee

(10) Patent No.: US 9,092,974 B2
(45) Date of Patent: Jul. 28, 2015

(54) MIXING DATA AND CONTROL CODES ON A WIRELESS LINK

(71) Applicant: Microsoft Corporation, Redmond, WA (US)

(72) Inventor: Dawson Yee, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 27 days.

(21) Appl. No.: 13/874,853

(22) Filed: May 1, 2013

(65) Prior Publication Data
US 2014/0328594 A1    Nov. 6, 2014

(51) Int. Cl.
*H04B 10/00* (2013.01)
*G08C 23/04* (2006.01)
*H04L 12/863* (2013.01)
*G08C 17/02* (2006.01)

(52) U.S. Cl.
CPC ............. *G08C 23/04* (2013.01); *G08C 17/02* (2013.01); *H04L 47/50* (2013.01); *G08C 2201/93* (2013.01)

(58) Field of Classification Search
CPC ............ H04B 10/114; H04B 10/1141; H04B 10/1143; H04B 10/1149; H04B 10/112; H04B 10/1121; H04B 10/502; H04B 10/504; G08C 23/04

USPC ......... 398/106, 118, 119, 125, 126, 127, 128, 398/130, 135, 136, 172, 182, 183, 202, 208, 398/209, 107, 189, 190, 191, 164; 340/825.69, 825.72, 825.22, 825.25; 348/734

See application file for complete search history.

(56) References Cited

U.S. PATENT DOCUMENTS

| | | | |
|---|---|---|---|
| 6,567,032 B1 * | 5/2003 | Mullaly et al. | 341/176 |
| 6,590,503 B1 * | 7/2003 | Elliott | 340/12.27 |
| 7,023,498 B2 * | 4/2006 | Ishihara | 348/734 |
| 8,348,145 B2 * | 1/2013 | Pratt | 235/375 |
| 2007/0290883 A1 * | 12/2007 | Kuboyama | 340/825.72 |

* cited by examiner

*Primary Examiner* — Hanh Phan
(74) *Attorney, Agent, or Firm* — Brandon Roper; Judy Yee; Micky Minhas

(57) ABSTRACT

The subject disclosure is directed towards using an emitter such as an IR blaster to output control traffic (e.g., control codes that control operation of an appliance or toy) and data traffic. The timing of the output of the control code traffic and the data traffic is controlled so that the control code traffic and the data traffic are independent of one another in time. The control code traffic may be output in between outputting the data traffic, so that a user does not perceive a delay when attempting to control a device via interactive control code requests.

20 Claims, 8 Drawing Sheets

US 9,092,974 B2

MIXING DATA AND CONTROL CODES ON A WIRELESS LINK

BACKGROUND

Infrared (IR) remote control codes are used to control electronic devices such as appliances (e.g., televisions, stereos and the like), some remote controlled toys, and the like. Some IR emitters need to be aimed towards the receiving device to have their signals received. Other emitters operate as an IR blaster that disperses IR signals to a wider area.

In general, however, these emitters are for one purpose, which is to output control codes to control the receiving device. Other IR emitters may be used for carrying audio to wireless headphones, for example, but again, are dedicated to a single purpose.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards interleaving control code traffic and data traffic for output via a common infrared emitter, including controlling timing of the output of the control code traffic and the data traffic so that the control code traffic and the data traffic are independent of one another in time. In one aspect, controlling the timing comprises outputting the control code traffic with higher priority than the data traffic, such as by interrupting transmission of the data traffic to output control code traffic or outputting control code traffic between pieces of data traffic.

In one aspect, a transmitter is coupled to a first input source corresponding to a first stream and a second input source corresponding to a second stream. Control logic is configured to determine when information is available in the first stream, the second stream, or both the first and second stream for transmission via the transmitter. The control logic is configured to control which stream has its information output via the transmitter at any given time.

In one aspect, a full set of non-control code data is output via an emitter to a recipient. While outputting the full set, described herein is determining whether a control code is ready to transmit. If so, the control code is output via the emitter in between outputting the full set of the non-control code data, by dividing the full set into subsets.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using an infrared (IR) emitter (such as an IR blaster) to control devices in a generally conventional way with control codes, as well as to transmit data (such as a data file) to a receiving device, referred to herein as a peripheral device. Among other benefits, this dual purpose usage model provides a cost effective solution to control devices and also send data to peripheral devices.

In one aspect, control codes are sent to control an appliance, toy or the like based upon user interaction with the sending device. In general, these codes are sent on demand in response to a button press or the like. When not in use for sending control codes, the emitter may be used to send non-control code data (including data-related commands) to a receiving device. This allows a device to inexpensively receive files and the like, e.g., for media playback, software updates, and/or the like.

A host device such as a smartphone or tablet that is configured with IR output capability is responsible for issuing both IR blasting traffic (control codes) and IR streaming data/command/content, while monitoring these activities in real time. In one implementation, a single IR blaster system that sends control codes is additionally configured to provide a wireless transmission system for IR streaming of data/commands. By monitoring the activity, the host device allows for control code traffic to take precedence over other data transmission traffic, so that a user's control requests are handled without any noticeable delay.

It should be understood that any of the examples herein are non-limiting. For instance, examples used herein refer to controlling an appliance or a toy, however any suitable device may be controlled. Further, infrared signaling is described, however other signals may benefit from the invention, including radio frequency (RF) signals or signals at other visible/non-visible wavelengths. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in signaling and data transmission in general.

Figure 1:
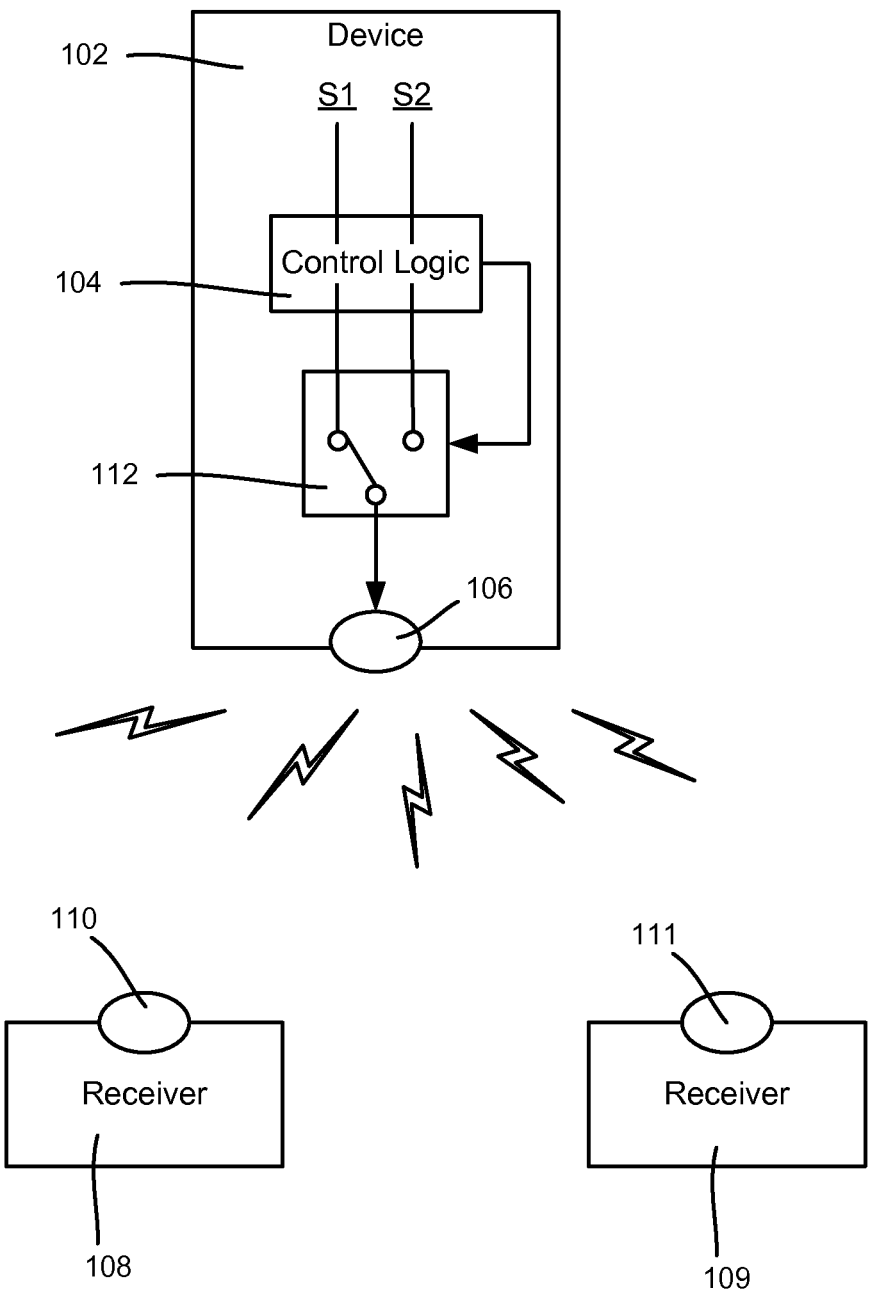
FIG. 1 is a block diagram representing an output emitter configured to output control code streams and at least one other data stream, according to one example implementation.

FIG. 1 is a general block diagram showing example concepts of the technology described herein. In general, an IR emitting device 102 contains control logic 104 that "switches" between providing different types of information to an emitter 106. e.g., a light emitting diode (LED), when such information is available for transmission. The emitter 106 wirelessly sends IR data (which may correspond to control codes or data/data-related commands) to receivers 108 and 109, e.g., via respective infrared detecting elements 110 and 111. Although a "switch" 112 is depicted in FIG. 1, instead of a switch, timing as to what information is sent at what time is used as the switching mechanism in one or more implementations.

As will be understood, the control logic 104 sends information from two or more sources, shown as streams S1 and S2, to the receivers 108 and 109. Although two receivers 108 and 109 are shown, it is understood that the streams (control codes and/or data) may be sent to any practical number of receivers. For example, the receiver A may be an appliance or the like that only responds to control codes, corresponding to codes within the stream S1; (not that while the term "stream" is used, the stream need not be continuous, and indeed for control codes is intermittent). The receiver 109 may receive both control codes corresponding to codes within the stream S1 and data/data-related commands corresponding to stream S2. For example, the receiver 109 may be a toy or other device that may be controlled by infrared commands, and also can receive data such as audio data for buffered/streamed playback or later playback. Thus, the technology works with as little as one receiver, e.g., the receiver 109 may be both controlled by control codes (e.g., within stream S1) and also receive data (within stream S2); no other receiver or receivers need be present in a given scenario.

Figure 2:
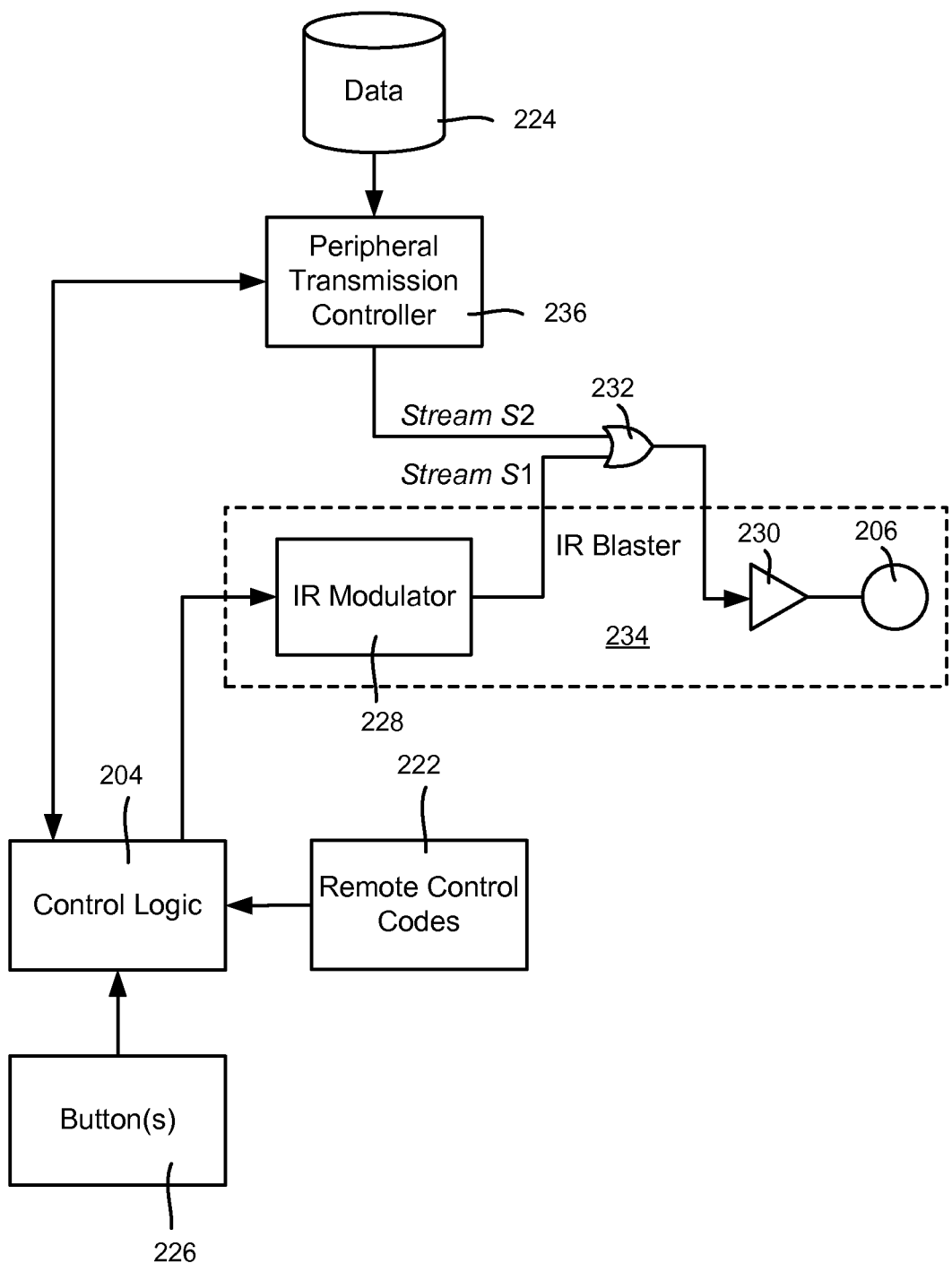
FIG. 2 is a block diagram representing example components configured to allow an infrared blaster or the like to output code streams and other data streams, according to one example implementation.

FIG. 2 shows an example implementation in which control logic 204 uses timing to switch between remote control codes 222 and data 224 for driving an infrared emitter 206. In general, in response to button 226 (e.g., mechanical or virtual, such as touch-screen) interaction, the control logic 204 looks up the appropriate remote control code information, and sends this information to an IR modulator 228 that outputs the code in the form of pulsed signals at the appropriate wavelength and/or pulse frequencies.

Note that in the example implementation of FIG. 2, instead of coupling the IR modulator's output to the emitter driver 230, the configuration inserts what is effectively an OR gate 232 or the like into the circuitry, e.g., basically modifying an existing IR blaster 234. The control logic 204 controls the timing of each stream output so that there is no unwanted mixing of signals.

As described herein, while a command is not being sent, the control logic 204 allows/manages transmission of any desired data to an appropriate peripheral device. By way of example, consider that a toy such as a remote control car is also configured to play audio from storage. An audio file (or files) may be downloaded to the toy through the toy's infrared receiver, whereby the owner is able to change the songs or the like that the toy can play back.

To this end, when the IR emitter 206 is not sending a command and data is ready to be sent, the control logic 204 instructs a peripheral transmission controller 236 to transmit the data from a queue or the like. The transmission is modulated by the peripheral transmission controller 236 at an appropriate wavelength so as to not be interpreted as a control code by another receiver, and, if appropriate, to be specific to a particular device. The IR streaming data/commands in general have a different packet format, modulation frequency, and/or protocol than the IR control code blasting traffic, which ensures that the two completely different purposes are never confused by the intended receiving devices. The IR light emissions come from the same IR LED emitter 206, but are transmitted with different protocols and the like.

Thus, in between control code output, the data 224 is transmitted to a peripheral device using the same IR emitter circuitry (230 and 206). To this end, the peripheral transmission controller 234 may prepare the data for transmission, e.g., providing data-related commands such as a start transmission command and an end transmission command, headers, checksums and so forth according to a suitable transmission protocol. As described herein, the data content to be transmitted may be separated into smaller pieces of data to avoid long transmission delays, and/or an interruption scheme may be used.

More particularly, user requests to send control codes are determined by the user and thus may come in at any unpredictable time. As with other remote control devices, the typical user expects the device that sends the code to be idle with respect to IR emissions until the user interacts with the device to perform some desired operation (which the device does by sending a control code). Although often the device will be idle, it is also possible that the device is instead transmitting data as described herein; indeed, the user need not be aware of any such data transmission taking place. To avoid user frustration in having a control code delayed (e.g., a user wants the television muted essentially immediately), the user interaction that sends a control code needs to be handled on demand. Thus, having large data transmissions that may cause a noticeable delay either need to be avoided or interrupted to avoid user frustration. Although in actuality there may be a small delay to interrupt or complete a data transmission, such a delay may be managed to be sufficiently short so as to not be noticeable to the user.

In one implementation, the data to be transmitted may be divided into pieces that can be transmitted in a relatively short time, e.g., small fractions of a second, e.g., on the order of a tenth or a quarter of a second. If a new command is requested by the user, the new command is sent between the transmission of such data pieces, with (a maximum of) approximately only this very slight delay. The transmission protocol may be such that the peripheral device waits for the next piece until all pieces are received.

Figure 3:
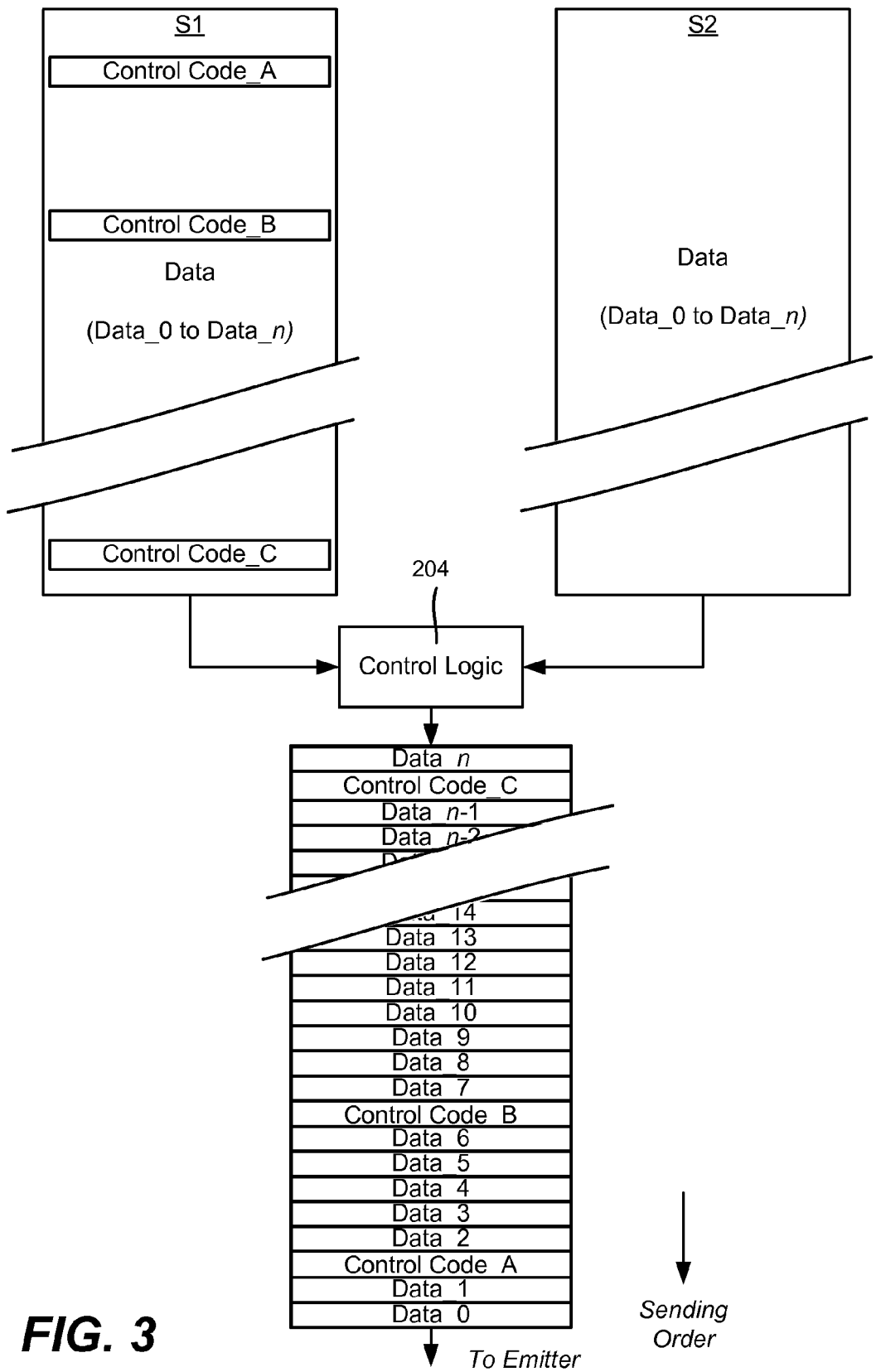
FIG. 3 is representation showing how control codes and data pieces may be interleaved according to one example implementation.
Figure 4:
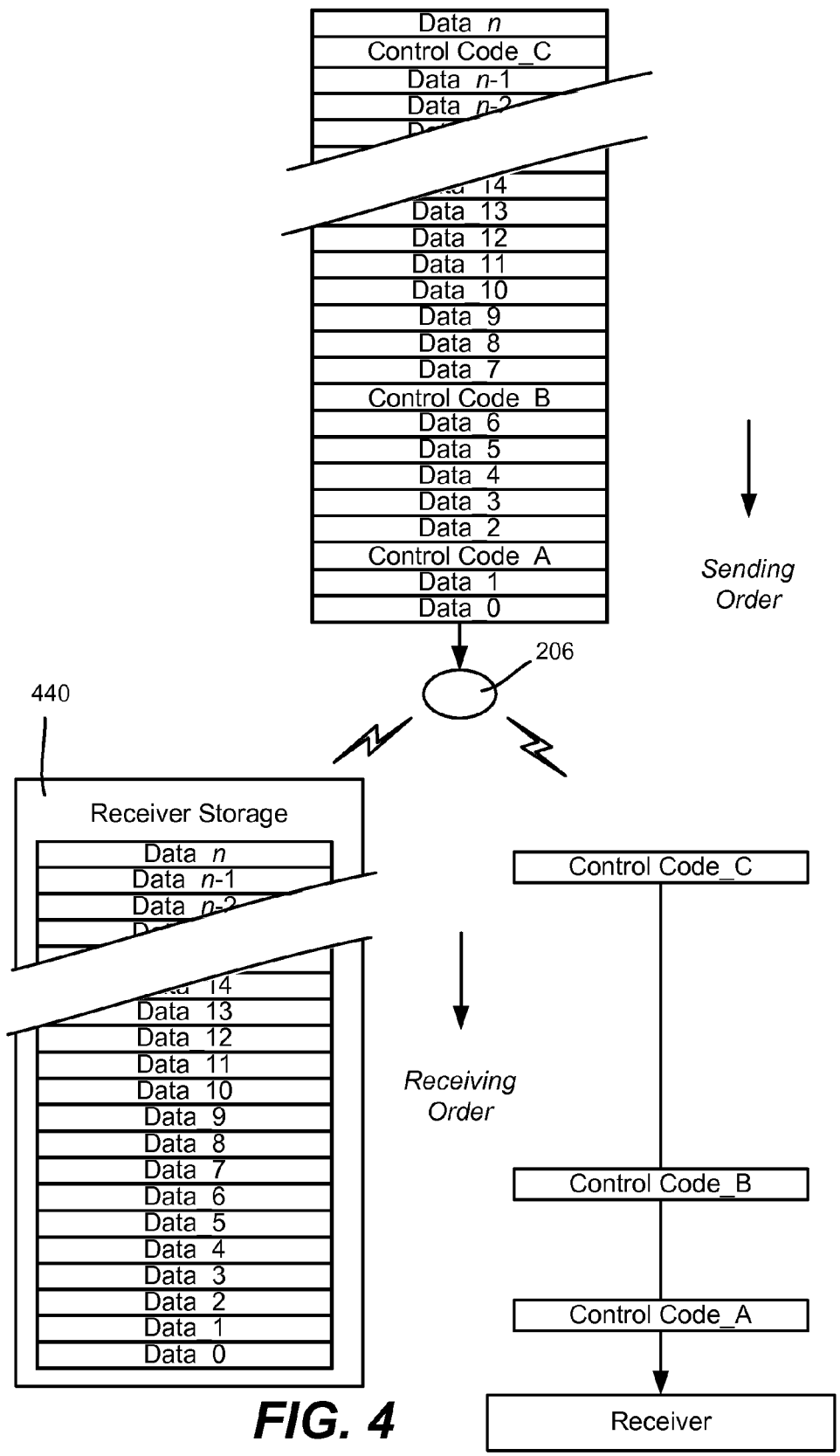
FIG. 4 is representation showing how interleaved control codes and data pieces may be sent and received at appropriate target receivers, according to one example implementation.

FIGS. 3 and 4 show such an example, in which control codes in stream S1 and data in stream S2 are provided by the control logic 204 in an interleaved manner to the emitter 206 over time. As can be seen, the data (Data_0 to Data_n) are divided into pieces, with any control codes interleaved in between data pieces on demand, as soon as those control codes are ready for transmission. Each receiver is programmed to ignore infrared signals that are not directed to that receiver, and approximately act upon those that are. Thus, when the data is transmitted, the receiver storage 440 (FIG. 4) of the corresponding receiver contains the desired data, with control codes having been processed and output on demand, basically instantaneous as far as the user can tell. As can be readily appreciated, a third data stream, fourth data stream and so forth may be similarly interleaved.

In an alternative implementation, larger pieces of data may be sent, however an alternative transmission protocol is such that an interruption (e.g., to send a command) during the transmission of a data piece is acceptable. For example, if a piece is not able to be sent in its entirety before a command needs to be sent, then the partial transmission may be cancelled and the piece may be re-transmitted, with the receiving peripheral discarding any partial pieces.

Figure 5:
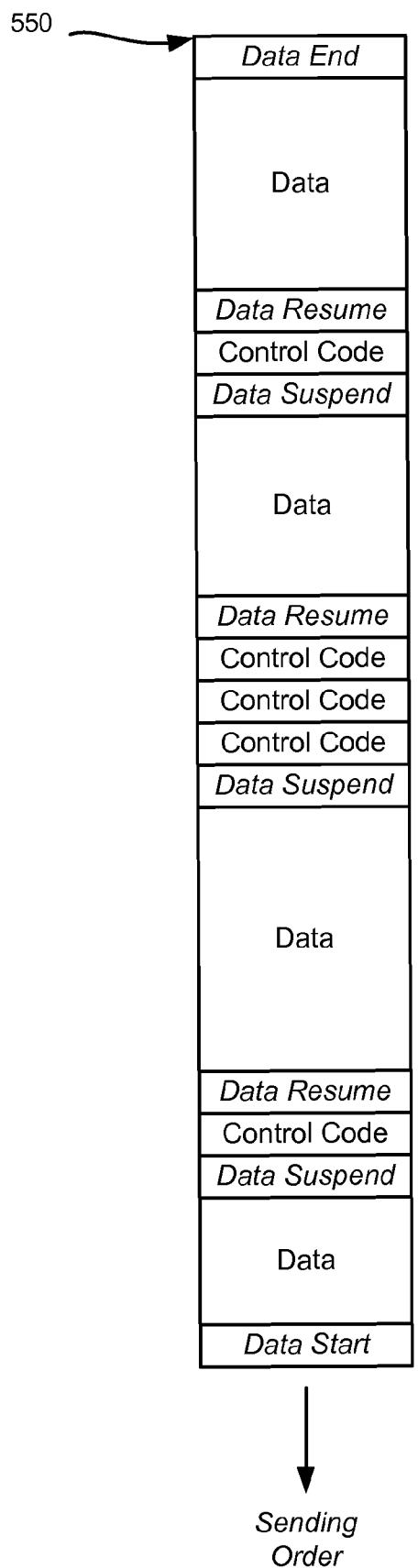
FIG. 5 is representation showing how data commands may be used to separate data pieces and control codes, according to one example implementation.

Alternatively, as generally represented in the sequence 550 of data-related commands, data and control codes shown in FIG. 5, suspend and resume messages or the like may be used to allow for partial transmissions/interruption. As shown in the example of FIG. 5, when sending data, a data suspend message may be sent during transmission of data to interleave a control code into the emitter's output; (multiple control codes may be sent in a row, such as if the user is holding down a volume button). When no control codes are being sent or pending, a data resume message may be used to instruct the receiver to prepare for receiving more data, and thereafter receive the data, which again may be interrupted by control codes, until the full transmission is complete. Suspend and resume commands may not be needed if, for example, transmission is such that signals at a different carrier frequency are simply ignored, whereby any interleaved traffic is simply considered a delay during transmission of a blob of data.

As can be readily appreciated, virtually any desired transmission protocol may be used, with techniques such as error coding, checksums and the like used to ensure that the transmitted data is properly received. This is particularly beneficial with one-way communication, where acknowledgements and the like cannot be returned.

Notwithstanding, two-way communication is also feasible, which also may be by way of infrared transmission, flashing visible light detectable by a camera on the controlling device, and so on.

Figure 6:
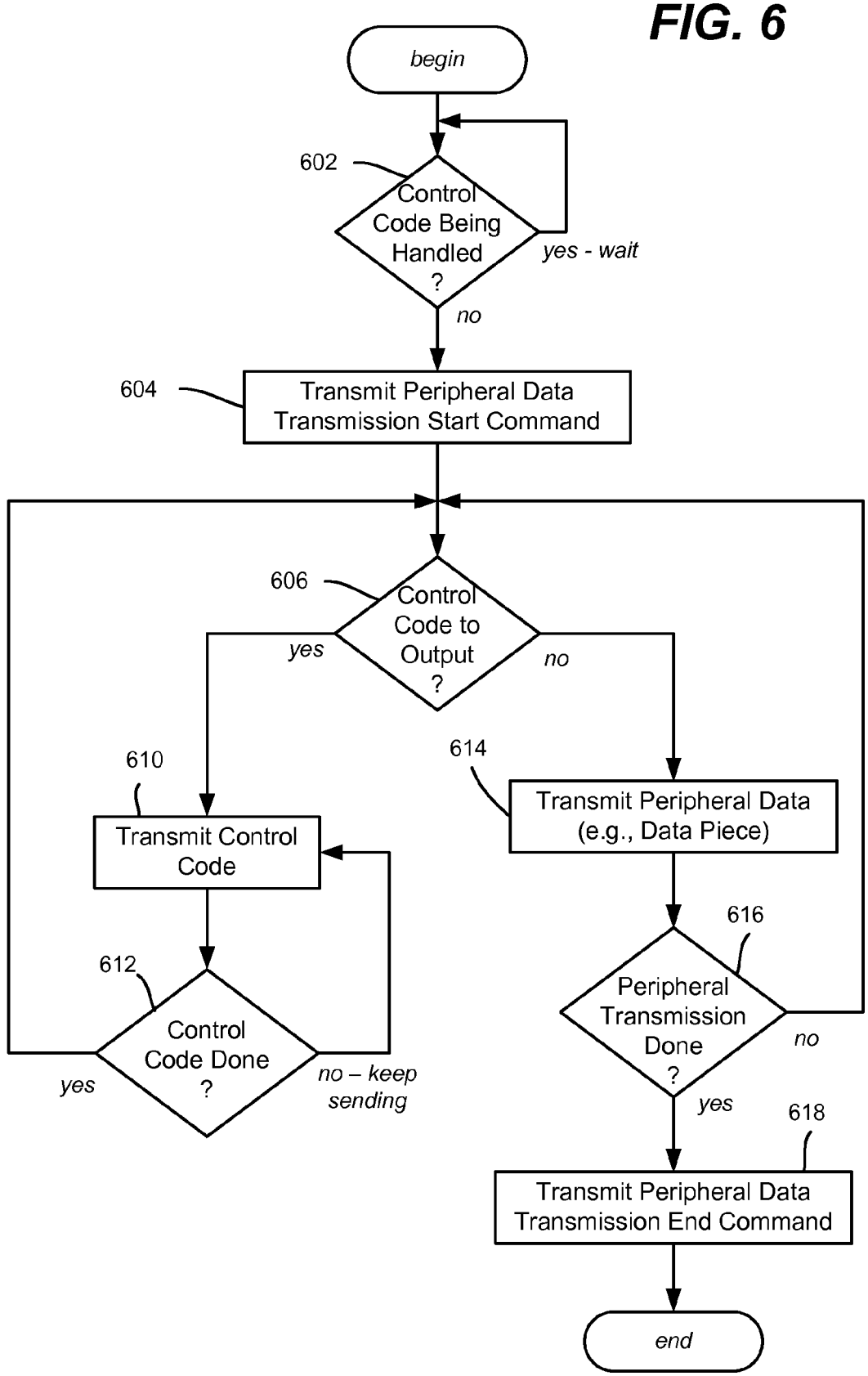
FIG. 6 is a flow diagram representing example steps that may be taken to transmit control codes and data pieces, according to one example implementation.

FIG. 6 is a flow diagram showing how control codes (e.g., blaster traffic) and data transmission may be interleaved to transmit from the same emitter. In the example of FIG. 6, when data traffic is available for transmission, an example protocol may be based upon small data pieces that transmit rapidly (so as to not noticeably delay a control code transmission) is used. For example, the flow of FIG. 6 may be used when a data file or some portion thereof (or the like, such as any data block or set of blocks) needs to be transmitted to a receiving device.

At step 602, the control logic determines if control code/IR blasting traffic is occurring or about to occur, e.g., whether a control code is being sent or prepared for sending. If so, the process waits for this code, and any subsequent codes, to complete.

Eventually no control codes will be pending or awaiting completion, and step 604 is executed to send a "start" data transmission command or the like to the peripheral device. This transmission may include a header, such as containing information about the number of packets or other transmission units to be sent, protocol information, and so on; alternatively a header may be sent as part of the data.

During this start transmission time, it is possible that the user has interacted with the hosting device such that another control code may be needed, as detected by step 606. If so, steps 610 and 612 represent transmitting the control code, returning to step 606 and so on until no control code or codes remain to be sent, at least for now.

Step 614 is executed when no control codes are being sent or being prepared for sending, and represents transmitting a piece of data to a peripheral device. If this is not the last piece, step 616 returns to step 606 to evaluate whether any control code needs to be sent, and if not, step 614 is executed with the next data piece and so on. Note that in this example protocol, the time taken by step 614 is sufficiently small so as to not cause a perceived delay between the time a user presses a button and the time that the control code is transmitted to the corresponding receiving device.

Eventually all of the pieces of data will have been sent to the peripheral device, whereby step 616 will branch to step 618 to send a peripheral data transmission end command or the like. Note that if the last data piece plus this end command takes too much time and thus may noticeably delay any control code, steps similar to steps 606, 610 and 612 may be present between steps 616 and 618 to handle any control code transmission.

If more efficient, the control logic may enter a mixed mode that interleaves data traffic and control code traffic only on an event or the like, and a separate control code mode that operates as a conventional controller. For example, when no data is pending, the control logic simply waits for a control code request and outputs the control code as received. If a notification that data to be transmitted is received, the control logic may enter the mixed mode to operate via the steps of FIG. 6, for example. This avoids having the logic consume extra cycles when no data traffic exists to transmit.

Further, note that in a different transmission protocol such as that represented in FIG. 5, a single data "piece" at step 614 may be interrupted by an interrupt or event, possibly using a suspend and resume command as described above. An alternative is to simply interleaving the control code traffic in the middle of a large data block, which the data receiver knows to ignore (or act upon differently if the control code is also directed to that data receiver).

Figure 7:
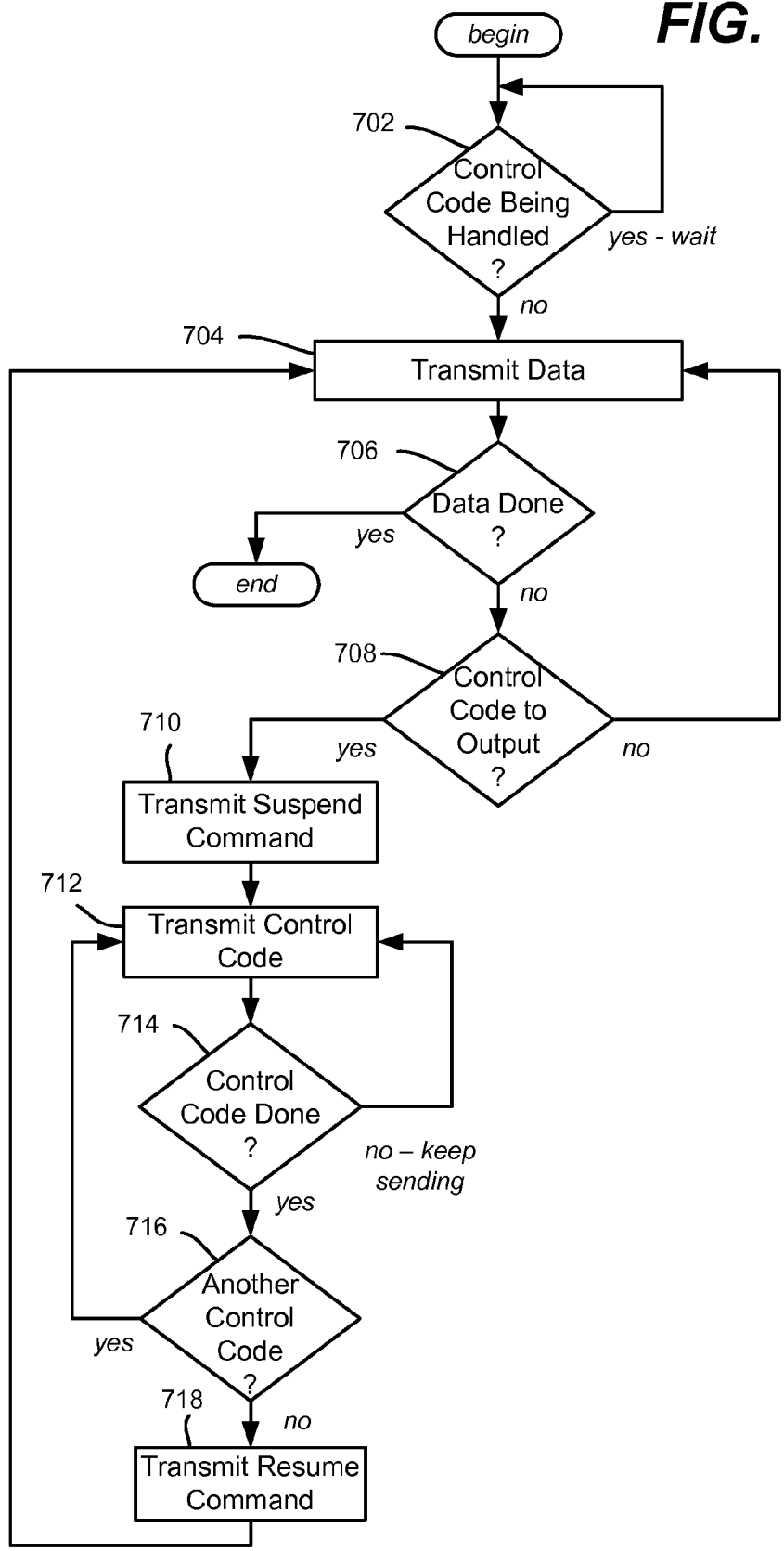
FIG. 7 is a flow diagram representing example steps that may be taken to transmit control codes between data transmissions, according to one example implementation.

By way of example, FIG. 7 shows steps of such an interruption-based protocol that uses suspend and resume commands. The data thus may be of any size, although it may be desirable to interrupt between packets of packet-based transmissions, for example, to suspend and resume only on agreed-upon boundaries. Note that in the example of FIG. 7, any "start transmission" command and "end transmission" command may be part of the larger data block, although it is feasible to have such commands in separate transmissions.

In FIG. 7, if a control code is currently being handled, which may include preparing one for transmission, the initial data transmission waits via step 702. When all control codes are done, data transmission of the possibly large block begins at step 704, which as described above, may be packetized. This step continues transmitting until the data is done (step 706) or a control code is ready to be output (step 708).

If a control code is ready, step 710 transmits a suspend command to the data recipient, which as described above, may occur at an agreed upon boundary such as at the end of a packet, in a manner that does not cause a perceived delay to the user. The control code is transmitted at steps 712 and 714, with any additional control codes handled at step 716 until no more remain to be transmitted.

When no more remain, a resume command is output at step 718, and the data resumes transmission at step 704 until the data transmission is complete.

Turning to another aspect, as described above, communication may be one-way from the emitter to the peripheral. Error coding, checksums and/or other techniques may be used to help ensure that data is correctly received. A failed transmission attempt may be discarded by the recipient. Some acknowledgement, including a manual acknowledgement where the user determines that the transmission succeeded or failed based upon the results (e.g., the audio is now a different song, or was supposed to have changed but did not) may be used to trigger a further action, such as the user requesting a retransmission.

In other environments, two-way communication may be used. For example, with Microsoft® Kinect™ technology, a camera/sensor is coupled to a device such as a gaming console and can be used for two-way communication. Even at a slow frame rate, the receiving device may contain an inexpensive LED or the like that flashes information to the sensor, where the information may be processed by the coupled device. Acknowledgements, packet identifiers, simple text, and so forth may be returned from the data receiver to the data sender/host device.

Moreover, the host can use the two-way communication link to ensure "line of sight" IR communications. For example, a host can first establish that a line of sight link exists before performing transmission, including RF transmission. This aids in reducing the concern of unintentional/undesired RF transmissions to a peripheral in the next room or adjacent floor.

As can be seen, a host device issues both conventional IR blasting traffic such as control codes, as well as streaming data-related commands/data content. The host device monitors the activities in real time, so as to provide a highly responsive remote control device that is also a data transmission system. In one implementation, an IR blaster system may be reconfigured to provide conventional blasting functionality and a wireless transmission system for IR streaming of data/commands.

Example Operating Environment

It can be readily appreciated that the above-described implementation and its alternatives may be implemented within any suitable computing or electronics device having a circuit board, including a gaming system, personal computer, tablet, DVR, set-top box, smartphone, appliance, audio receiver, television and/or the like. An IR blaster device may, for example, reside in a living room or similar environment, and the computing driving the IR blaster may be a gaming console, set-top box, or smart TV, or some other home entertainment device (e.g., stereo receiver, optical disk player, DVR and so forth). Mobile devices are similarly feasible to incorporate or be coupled to an IR emitter.

Combinations of such devices are also feasible when multiple such devices are linked together. For purposes of description, a gaming (including media) system is described as one exemplary operating environment hereinafter. As can be readily appreciated, the various chip cooling techniques described above may be applied to any appropriate circuitry of the integrated circuits described below.

Figure 8:
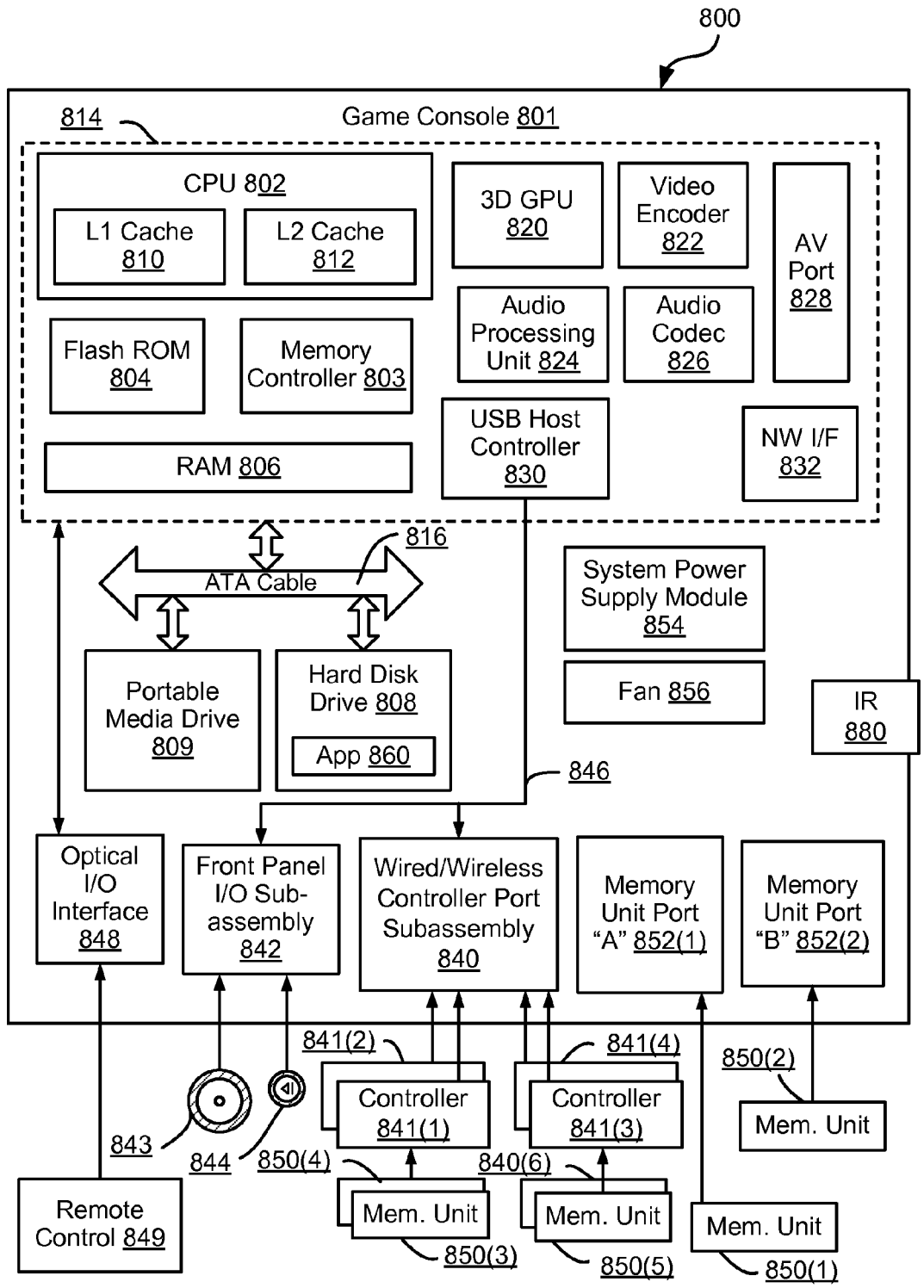
FIG. 8 is a block diagram representing an example non-limiting computing system or operating environment, e.g., in the form of a gamin console, in which one or more aspects of various embodiments described herein can be implemented.

FIG. 8 is a functional block diagram of an example gaming and media system 800 and shows functional components in more detail. Console 801 has a central processing unit (CPU) 802, and a memory controller 803 that facilitates processor access to various types of memory, including a flash Read Only Memory (ROM) 804, a Random Access Memory (RAM) 806, a hard disk drive 808, and portable media drive 809. In one implementation, the CPU 802 includes a level 1 cache 810, and a level 2 cache 812 to temporarily store data and hence reduce the number of memory access cycles made to the hard drive, thereby improving processing speed and throughput.

The CPU 802, the memory controller 803, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 802, the memory controller 803, the ROM 804, and the RAM 806 are integrated onto a common module 814. In this implementation, the ROM 804 is configured as a flash ROM that is connected to the memory controller 803 via a Peripheral Component Interconnect (PCI) bus or the like and a ROM bus or the like (neither of which are shown). The RAM 806 may be configured as multiple Double Data Rate Synchronous Dynamic RAM (DDR SDRAM) modules that are independently controlled by the memory controller 803 via separate buses (not shown). The hard disk drive 808 and the portable media drive 809 are shown connected to the memory controller 803 via the PCI bus and an AT Attachment (ATA) bus 816. However, in other implementations, dedicated data bus structures of different types can also be applied in the alternative.

A three-dimensional graphics processing unit 820 and a video encoder 822 form a video processing pipeline for high speed and high resolution (e.g., High Definition) graphics processing. Data are carried from the graphics processing unit 820 to the video encoder 822 via a digital video bus (not shown). An audio processing unit 824 and an audio codec (coder/decoder) 826 form a corresponding audio processing pipeline for multi-channel audio processing of various digital audio formats. Audio data are carried between the audio processing unit 824 and the audio codec 826 via a communication link (not shown). The video and audio processing pipelines output data to an A/V (audio/video) port 828 for transmission to a television or other display/speakers. In the illustrated implementation, the video and audio processing components 820, 822, 824, 826 and 828 are mounted on the module 814.

FIG. 8 shows the module 814 including a USB host controller 830 and a network interface (NW I/F) 832, which may include wired and/or wireless components. The USB host controller 830 is shown in communication with the CPU 802 and the memory controller 803 via a bus (e.g., PCI bus) and serves as host for peripheral controllers 834. The network interface 832 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 8, the console 801 includes a controller support subassembly 840, for supporting four game controllers 841(1)-841(4). The controller support subassembly 840 includes any hardware and software components needed to support wired and/or wireless operation with an external control device, such as for example, a media and game controller. A front panel I/O subassembly 842 supports the multiple functionalities of a power button 843, an eject button 844, as well as any other buttons and any LEDs (light emitting diodes) or other indicators exposed on the outer surface of the console 801. The subassemblies 840 and 842 are in communication with the module 814 via one or more cable assemblies 846 or the like. In other implementations, the console 801 can include additional controller subassemblies. The illustrated implementation also shows an optical I/O interface 848 that is configured to send and receive signals (e.g., from a remote control 849) that can be communicated to the module 814.

Memory units (MUs) 850(1) and 850(2) are illustrated as being connectable to MU ports "A" 852(1) and "B" 852(2), respectively. Each MU 850 offers additional storage on which games, game parameters, and other data may be stored. In some implementations, the other data can include one or more of a digital game component, an executable gaming application, an instruction set for expanding a gaming application, and a media file. When inserted into the console 801, each MU 850 can be accessed by the memory controller 803.

A system power supply module 854 provides power to the components of the gaming system 800. A fan 856 cools the circuitry within the console 801.

An application 860 comprising machine instructions is typically stored on the hard disk drive 808. When the console 801 is powered on, various portions of the application 860 are loaded into the RAM 806, and/or the caches 810 and 812, for execution on the CPU 802. In general, the application 860 can include one or more program modules for performing various display functions, such as controlling dialog screens for presentation on a display (e.g., high definition monitor), controlling transactions based on user inputs and controlling data transmission and reception between the console 801 and externally connected devices.

The gaming system 800 may be operated as a standalone system by connecting the system to high definition monitor, a television, a video projector, or other display device. In this standalone mode, the gaming system 800 enables one or more players to play games, or enjoy digital media, e.g., by watching movies, or listening to music. However, with the integration of broadband connectivity made available through the network interface 832, gaming system 800 may further be operated as a participating component in a larger network gaming community or system. As described above, communication also may be by infrared emitter (IR) 880; an IR detector or other sensor (not shown) also may be present. An external IR emitter such as an IR blaster may be coupled to the gaming system 801 or other such computing/electronic device.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method comprising:
   interleaving control code traffic and data traffic for output via a common infrared emitter, including controlling timing of the output of the control code traffic and the data traffic so that the control code traffic used to control a receiving device and the data traffic are independent of one another in time, the data traffic not being used for controlling the receiving device.

2. The method of claim 1 wherein controlling the timing comprises outputting at least part of the data traffic when no control code is being transmitted or is pending transmission.

3. The method of claim 1 wherein controlling the timing comprises outputting the control code traffic with higher priority than the data traffic.

4. The method of claim 1 wherein controlling the timing comprises interrupting transmission of the data traffic to output the control code traffic.

5. The method of claim 1 wherein controlling the timing comprises outputting the control code traffic between pieces of the data traffic.

6. The method of claim 1 further comprising:
   receiving the data traffic at the receiving device; and
   storing data corresponding to the data traffic in a storage of the receiving device.

7. The method of claim 1 further comprising:
   receiving a communication from a recipient of the data traffic.

8. The method of claim 1 further comprising:
   processing a data file into one or more pieces of data for output as the data traffic.

9. A system comprising:
   a transmitter coupled to a first input source corresponding to a first stream and a second input source corresponding to a second stream; and
   control logic configured to determine when information is available in the first stream, the second stream, or both the first stream and the second stream for transmission via the transmitter, and responsive to a determination that the information is available in at least one of the first stream or the second stream, the control logic configured to control which stream has its information output via the transmitter at any given time, the information output from the first stream transmitted using a first transmission protocol and the information output from the second stream transmitted using a second transmission protocol.

10. The system of claim 9 wherein the transmitter comprises infrared (IR) emitter circuitry.

11. The system of claim 9 wherein the first stream corresponds to one or more control codes, and the second stream corresponds to non-control code data.

12. The system of claim 9 wherein the information in the first stream is modulated by an infrared (IR) modulator of an IR blaster before transmission by the transmitter, and wherein the information in the second stream bypasses the infrared (IR) modulator before transmission by the transmitter.

13. The system of claim 9 further comprising a sensor configured to receive communications back from a recipient of the non-control code data.

14. The system of claim 9 wherein the second stream comprises media data.

15. The system of claim 9 wherein the transmitter and the control logic are incorporated into a gaming console, a set-top box, a smart television, a home entertainment device, a smartphone, an appliance or toy remote control, or a tablet computing device.

16. One or more computer memories having executable instructions, which when executed by a computer cause the computer to perform steps comprising:
   outputting a full set of non-control code data via an emitter to a recipient, including while outputting the full set, determining whether a control code is ready to transmit, and if so, outputting the control code via the emitter in between outputting the full set of the non-control code data by dividing the full set into subsets.

17. The one or more computer memories of claim 16 having further computer-executable instructions comprising:
   transmitting a suspend command before outputting the control code and outputting a resume command after outputting the control code.

18. The one or more computer memories of claim 16 having further computer-executable instructions comprising:
   detecting interaction of a user directed towards outputting the control code, in which dividing the full set into subsets results in the control code being output with a delay that is not substantially perceptible to the user.

19. The one or more computer memories of claim 16 wherein outputting the full set of non-control code data and the control code comprises transmitting both the full set of non-control code data and the control code for reception by a same recipient device.

20. The one or more computer memories of claim 16 wherein outputting the full set of non-control code data and the control code comprises transmitting the full set of non-control code data to one or more recipient devices, and the control code to at least one different recipient device.

* * * * *